United States Patent [19]

Carlyle

[11] Patent Number: 4,811,982
[45] Date of Patent: Mar. 14, 1989

[54] AUTOMOBILE WINDOW SHIELD AND COVERING

[76] Inventor: Richard Carlyle, 1195 Atlanta Way, Costa Mesa, Calif. 92626

[21] Appl. No.: 72,298

[22] Filed: Jul. 13, 1987

[51] Int. Cl.$^4$ .............................................. B60J 11/00
[52] U.S. Cl. ................... 296/95.1; 296/97.7
[58] Field of Search ............... 296/95 R, 95 C, 97 R, 296/97 D; 160/354, DIG. 3, DIG. 2

[56] References Cited

U.S. PATENT DOCUMENTS

| | | | |
|---|---|---|---|
| 3,046,048 | 7/1962 | Cheney | 296/95 C |
| 3,863,293 | 2/1975 | Selph | 296/97 R |
| 4,353,593 | 10/1982 | Henson | 296/97 D |

*Primary Examiner*—Robert R. Song
*Attorney, Agent, or Firm*—Gary Appel

[57] ABSTRACT

An automobile window shield and cover is formed of a thin, disposable sheet of strong water resistant paper, plastic, or similar inexpensive material. The sheets are factory cut to approximate the size and shape for various sized automobile (and other vehicle) windows, such as windshields, rear and side windows, and have an adhesive backing which is factory-applied to at least peripheral edge regions of the back to enable the sheets to be adhered to an appropriate automobile window in such a manner as to cover most of it, thereby protecting it against the buildup of snow and ice in winter weather conditions. Peeling the sheet from the window before the automobile is to be driven, thus enables the driver to remove any snow and ice from the window. The sheets may be perforated from one edge to an opposite edge in one or more places, to enable the sheets to be selectively removed in sections or strips, and may be provided in pads of a number of sheets for user convenience.

1 Claim, 1 Drawing Sheet

AUTOMOBILE WINDOW SHIELD AND COVERING

BACKGROUND OF THE INVENTION

1. Field of the Invention

The present invention relates generally to the field of automobile windshield and window protectors, and more particularly to devices which protect the windshields and windows of vehicles parked out-of-doors in the winter against buildup of snow and ice.

2. Discussion of the Prior Art

As is well known, in winter in northern climates, snow and ice commonly accumulate on the windshields and windows of automobiles, trucks, vans and other vehicles which are parked out of doors. It is usually a troublesome and frequently a difficult task to remove sufficient amounts of such snow, particularly frozen snow and ice, to permit sufficient visibility for safe driving. Although commercially available plastic scrapers and even plastic credit cards are often used for removing snow and light ice from vehicle windows, frequently the thick ice and frozen snow has to be chipped away and/or the vehicle window defrosters have to be operated from within the vehicle, for a relatively long time to melt the ice and snow, before the vehicle can be safely operated. Chipping away of thick ice and frozen snow is, of course, time consuming because of the care which must be taken to prevent damage to the windows; and, even with care the windows may be nicked or even cracked by a scraping utensil.

Various make-shift and/or homemade shields or covers are sometimes used to prevent the accumulation of snow and ice on vehicle windows. Such shields or covers may, for example, merely be large pieces of cardboard (usually hand-cut from large cardboard boxes) which are placed over the outside of the parked vehicles' windows when snow or icing conditions are anticipated. Alternatively, pieces of fabric, such as carpet remnants, may be used to cover the windows. After snow and/or ice have accumulated on the window covers, the covers are pulled off from the windows before the vehicle is to be driven, thereby usually clearing enough snow and ice off the windows to permit safe driving.

Numerous drawbacks are, however, associated with the use of such makeshift shields and covers. Often the materials needed to make such covers are not readily available in the quantities required to last a winter. Moreover, the cutting of cardboard covers is time consuming and frequently difficult without special cutting tools. Still further, since strong winds often accompany winter storms which cause icing conditions, the protective covers may be blown off the vehicle windows without providing any protection. Cardboard window protectors may become saturated in wet snow or sleet conditions, and may thereafter tear in pieces during removal, or else they may become frozen to the window and be even more difficult to remove than the snow and ice it was meant to protect against. As mentioned above, it may be difficult to make enough disposable window covers to last an entire winter season. On the other hand, reusable protectors, such as may be made from pieces of old carpet, may tend to be stolen from vehicles parked outside in urban areas. Fabric protective devices may also become wet and then frozen stiff and become difficult to remove. In any event, they may become too wet or encrusted with snow or ice for a driver to readily store them in his or her vehicle after use.

For these and other reasons, the need exists for improved devices for protecting vehicle windshields, and other windows as well, from ice and snow in northern climates, and particularly for inexpensive, disposable, yet effective, window protectors. It is, therefore, a principal object of this invention to provide such improved protectors for vehicle windshields and windows.

SUMMARY OF THE INVENTION

According to the present invention, a protective covering for vehicle windows, such as windshields, rear and side windows, to prevent the accumulation of snow and ice on the windows of vehicles parked out-of-doors in winter weather, comprises a thin, semi-flexible sheet of water-resistant material. Applied to a rear surface of the sheet, at least along peripheral edge regions, is an adhesive backing which enables the sheet to be detachably mounted to the outside surface of a vehicle window to cover major portions thereof. After the vehicle, to which the protective covering or coverings are applied, is subjected to snow or icing conditions and before the vehicle is to be driven, the protective covering is removed from the window or windows, removal of the sheets from the windows causing the combined removal of any ice or snow which is accumulated thereon, and which would otherwise have accumulated on the windows to which the sheets were adhesively applied.

Preferably the sheet is inexpensively constructed of factory-cut, heavy or tear-resistant waterproof paper, the sheets being intended to be disposable after a single use for convenience. In one embodiment, the sheet includes means defining at least one tear line across the sheet, so that the sheet can be easily torn into at least two pieces for added convenience in removal, particularly if a thick layer of snow or ice has accumulated on the covering. Also for convenience, a number of such sheets may be formed into a pad from which the sheets may be removed, one at a time, as the need arises.

BRIEF DESCRIPTION OF THE DRAWING

A better understanding of the present invention may be had from the following detailed description when taken in conjunction with the accompanying drawing in which.

DESCRIPTION OF THE PREFERRED EMBODIMENT

Figure 1:
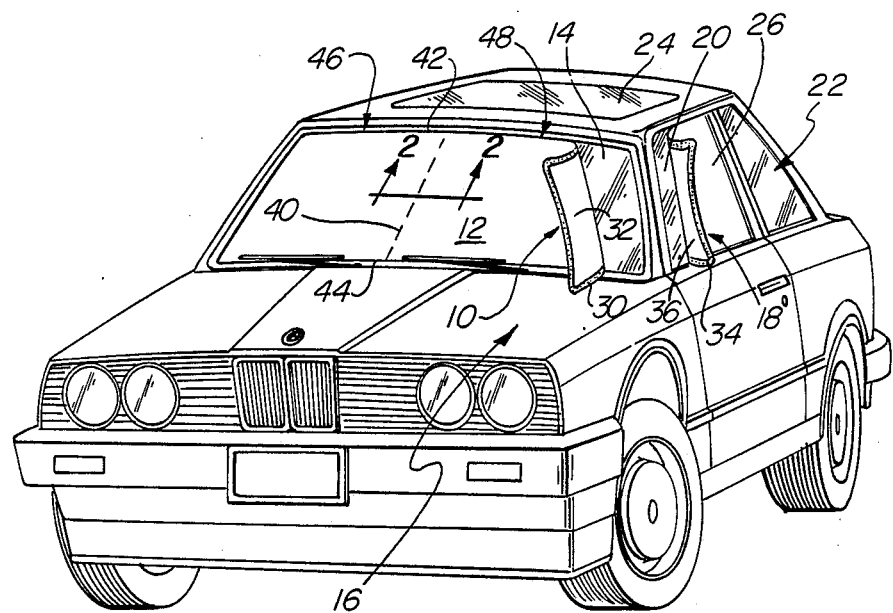
FIG. 1 is a perspective drawing of a windshield region of an exemplary automobile showing installation of a windshield protector of the present invention.
Figure 2:
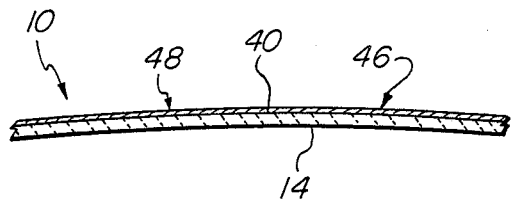
FIG. 2 is a cross sectional view along line 2—2 of FIG. 1 showing construction and installation of the windshield protector.

As shown in FIG. 1, a vehicle window protector device or cover 10, according to the present invention, comprises generally a thin, flexible sheet 12 which is generally factory cut or contoured to cover at least major portions of a windshield 14 of a particular type of vehicle 16—an automobile being shown—upon which it is intended to use the protective cover. A similar protector 18 may be configured for installation onto a vehicle side window 20, for example, a driver's window.

Still other similar protectors (not shown) may be configured for covering other windows, such as a rear side window 22 or sun roof window 24 or a back window or passenger side windows (not shown) of vehicle 16.

Preferably, for purposes of economy and disposability, window covers 10 and 18, as well as other similar window covers for other vehicle windows, are constructed of a thin, flexible, waterproof and tear-resistant paper or very light cardboard material. Alternatively, covers 10 and 18 (and others) may be constructed of a thin film of tough plastic material, and in such case may or may not be disposable according to such factors as the thickness and cost of the plastic materials. In this regard, it can be appreciated that any snow and ice will generally be easily removed from plastic covers so that the storage of such covers in a vehicle after use will usually not be a problem.

For greatest user convenience, it would, however, be preferred that the material used to make covers 12, 18, etc. should be sufficiently inexpensive so that the covers can be discarded after a single use, and so that drying and storing of used covers is unnecessary.

As above mentioned, covers 10, 18 (etc.) are preferably factory cut to shape to fit particular classes of vehicles. One size of windshield protectors 10 may therefore be constructed to reasonably fit the windshields of most compact automobiles, another size may be provided for full size automobiles, another size for trucks of certain types, and so forth. Similarly, side window protectors 18 may be factory cut in different sizes so as to fit different classes and types of vehicles. Since, however, it is usually unnecessary to completely protect windows from edge to edge to enable sufficient snow and ice removal for safe driving, the same size of covers 10 and 18 (etc.) can typically be used for many different sized windshields and windows. This latter feature is desirable from the standpoint of inventory and stocking of the protectors by retailers, wholesalers, fleet vehicle owners and even home owners who may have two or more different size or types of vehicles.

In order for covers 10, 18 (etc.) of the present invention to provide the intended good protection from the accumulation of snow and ice on vehicle windshields and windows, the covers are constructed with provisions for enabling sheet 12 of cover 10 to be detachably stuck to corresponding windshield 14, for a sheet 26 of cover 18 to be detachably stuck to corresponding window 20, and other similar sheets to be detachably stuck to the windows for which they are intended.

For this purpose, sheets 12 and 26, as well as similar sheets of other covers (not shown) for other windows, are factory constructed having a backing adhesive applied to at least peripheral edge regions of the back surface of the covers. For example, the adhesive may be applied in peripheral edge region 30 of a rear surface 32 of sheet 12 and to a corresponding peripheral edge region 34 of a back surface 36 of sheet 26. Adhesive may, of course, be applied to other regions of back surfaces 32 and 36 of sheets 12 and 18, and may, if desired, be applied over the entire back surfaces. Sufficient adhesive is, however, used to assure that covers 10, 18, (etc.) adhere to vehicle windows that are not necessarily clean, while still enabling the covers to be removed from the windows without undue difficulty.

For use in covering windshields, which are normally quite large in area, cover 10 may be constructed having a line of tear perforations 40 between a top edge 42 and a bottom edge 44. Such perforation line 40 enables a user to tear cover 10 into two sections 46 and 48 for convenience in removing the cover from window 14. Also, if desired, cover 10 can be torn into two parts along line 40 before installation. Depending on the overall size and use of the cover involved, more than one tear line 40 of perforations may be provided or no tear line of perforations may be provided.

Figure 3:
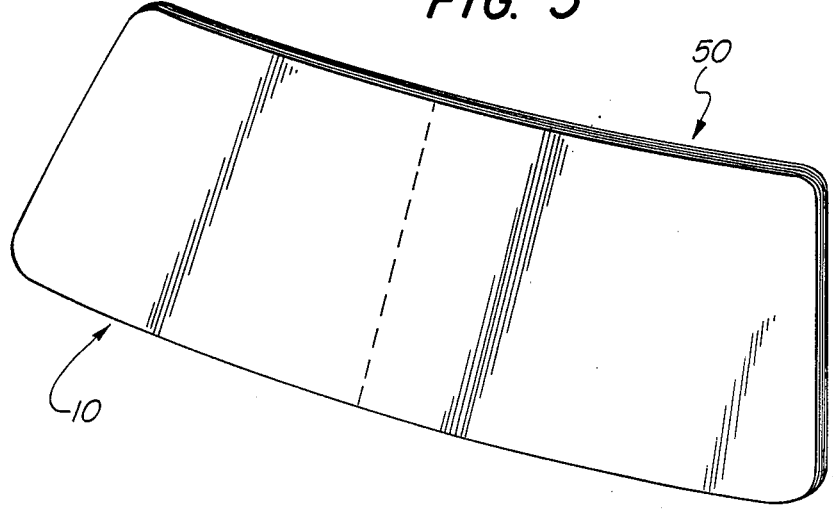
FIG. 3 is a perspective drawing of a pad of windshield protectors.

For user convenience and for the convenience of retailers, covers 10, 18, (etc.) may be provided in pads 50 (FIG. 3) from which the covers may be removed as needed. This also provides for protection of adhesive regions, for example, adhesive region 30 of cover 10. Otherwise, it may be necessary to provide peel off strips (not shown) to cover the adhesive regions.

As an added feature of the present invention, covers 10, 18, (etc.) can be imprinted with advertising for use as promotional items, for example, by service stations.

It will, of course, be appreciated that covers 10 and 18 similar covers for back windows can be used for purposes other than the removal of snow and ice. They may, as an illustration, also or alternatively be used to keep windshields and back windows clean when vehicle 16 is parked under certain types of trees which exude a misty sap or when the vehicle is parked near the ocean where ocean mist might otherwise cover the windows.

Although there has been described above a particular embodiment of a vehicle windshield and window protector in accordance with the present invention for the purpose of illustrating a manner in which the invention may be used to advantage, it is to be appreciated that the invention is not limited thereto. Accordingly, any and all variations and modifications which may occur to those skilled in the art are to be considered to be within the scope and spirit of the invention as defined in the appended claims.

What is claimed is:

1. A protective window covering for vehicle windows, such as windshields, rear, and side windows, to prevent the accumulation of snow and ice on the windows of vehicles parked out-of-doors in winter weather, the protective cover being comprised of a thin, semi-flexible sheet of water-resistant material and having applied to a rear surface thereof, at least along peripheral edge regions, an adhesive backing enabling the sheet to be detachably mounted to the outside surface of a vehicle window, so as to cover major portions thereof, whereby removal of the sheet from the window causes the removal of any ice or snow which has accumulated on the sheet and which would otherwise have accumulated on the window to which the sheet was detachably applied, said sheet including means defining at least one tear line across the sheet so that the sheet can easily be torn into at least two pieces, being joined together in a pad.

* * * * *